United States Patent
Lee et al.

(10) Patent No.: US 12,249,124 B2
(45) Date of Patent: Mar. 11, 2025

(54) SUPER RESOLUTION DEVICE AND METHOD

(71) Applicant: Realtek Semiconductor Corporation, Hsinchu (TW)

(72) Inventors: Kung Ho Lee, Hsinchu (TW); Yu Cheng Cheng, Hsinchu (TW); Hsu-Tung Shih, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 119 days.

(21) Appl. No.: 17/936,851

(22) Filed: Sep. 30, 2022

(65) Prior Publication Data
US 2023/0368496 A1 Nov. 16, 2023

(30) Foreign Application Priority Data
May 12, 2022 (TW) .................................. 111117909

(51) Int. Cl.
*G06T 17/00* (2006.01)
*G06T 3/4053* (2024.01)
*G06V 10/77* (2022.01)

(52) U.S. Cl.
CPC ........ *G06V 10/7715* (2022.01); *G06T 3/4053* (2013.01)

(58) Field of Classification Search
CPC .... G06T 3/40; G06T 3/00; G06T 1/00; G06T 3/4053; G06T 9/00; G06T 15/005; G06T 2210/36; G06T 3/4046; G01C 5/00; G06N 20/00; A63F 13/355; A63F 13/52; G06V 10/7715; G06V 10/82

USPC ......................................................... 345/428
See application file for complete search history.

(56) References Cited

U.S. PATENT DOCUMENTS

| | | | |
|---|---|---|---|
| 2013/0050272 A1* | 2/2013 | Bernard | G06T 3/40 345/667 |
| 2017/0214884 A1* | 7/2017 | Tatsumi | H04N 9/77 |
| 2019/0087718 A1* | 3/2019 | Martin | G06F 7/483 |
| 2021/0256680 A1* | 8/2021 | Xie | G06N 3/063 |
| 2022/0114424 A1* | 4/2022 | Quader | G06V 10/454 |

FOREIGN PATENT DOCUMENTS

| | | |
|---|---|---|
| CN | 103914687 A | 7/2014 |
| CN | 111696038 A | 9/2020 |
| TW | 201837854 A | 10/2018 |
| TW | 202006662 A | 2/2020 |

* cited by examiner

*Primary Examiner* — Gordon G Liu
(74) *Attorney, Agent, or Firm* — CKC & Partners Co., LLC (57) ABSTRACT

A super resolution device and method are provided. The device comprises an input interface and a sharing layer calculator group. An image and a scaling signal are received by the input interface, wherein the scaling signal is configured to indicate to perform a double scaling operation or a quadruple scaling operation to the image. When the scaling signal indicates to perform the quadruple scaling operation, the sharing layer calculator group performs a plurality of convolution operations based on a first number of input channels and a first number of output channels. When the scaling signal indicates to perform the double scaling operation, the sharing layer calculator group performs the convolution operations based on a second number of input channels and a second number of output channels.

20 Claims, 8 Drawing Sheets

SUPER RESOLUTION DEVICE AND METHOD

CROSS-REFERENCE TO RELATED APPLICATION

This application claims priority to Taiwan Application Serial Number 111117909, filed May 12, 2022, which is herein incorporated by reference in its entirety.

BACKGROUND

Field of Invention

The present invention relates to a super resolution device and method. More particularly, the present invention relates to a super resolution device and method that can share a sharing layer calculator group.

Description of Related Art

In the prior art, when using a convolutional neural network of a hardware circuit to perform image super resolution scaling, it is necessary to first perform feature extraction on the image through a convolutional neural network model. However, since a convolutional neural network model can only perform a corresponding magnification, different convolutional neural network models need to be trained for feature extraction for different magnifications. For example, when the hardware device simultaneously provides double scaling operation or quadruple scaling operation, two different sets of hardware circuits are required to perform corresponding feature extraction respectively.

Therefore, if multiple sets of convolutional neural network models are provided to correspond to different magnifications, additional hardware circuits corresponding to different magnifications must be fabricated, resulting in a substantial increase in the area of the circuit.

Accordingly, there is an urgent need for a technology that can share the feature extraction circuits used in different magnifications to save circuit area.

SUMMARY

An objective of the present disclosure is to provide a super resolution device. The super resolution device comprises an input interface and a sharing layer calculator group. The input interface is configured to receive an image and a scaling signal, and the scaling signal is configured to indicate to perform a double scaling operation or a quadruple scaling operation to the image. The sharing layer calculator group comprises a plurality of multiply-accumulate calculators corresponding to a first number, the multiply-accumulate calculators are configured to perform a plurality of convolution operations, and the first number is twice as big as an initial number of output channels. When the scaling signal indicates to perform the quadruple scaling operation, the sharing layer calculator group performs the convolution operations based on a first number of input channels and a first number of output channels, and the first number of input channels and the first number of output channels are at least an even positive integer greater than or equal to 2. When the scaling signal indicates to perform the double scaling operation, the sharing layer calculator group performs the convolution operations based on a second number of input channels and a second number of output channels. The first number of input channels is twice as big as the second number of input channels, and the first number of output channels is twice as big as the second number of output channels.

Another objective of the present disclosure is to provide a super resolution method, which is adapted for use in a super resolution device. The super resolution device comprises an input interface and a sharing layer calculator group, the sharing layer calculator group comprises a plurality of multiply-accumulate calculators corresponding to a first number, the multiply-accumulate calculators are configured to perform a plurality of convolution operations, the first number is twice as big as an initial number of output channels, and the super resolution method comprises following steps: receiving an image and a scaling signal, wherein the scaling signal is configured to indicate to perform a double scaling operation or a quadruple scaling operation to the image; performing the convolution operations by the sharing layer calculator group based on a first number of input channels and a first number of output channels when the scaling signal indicates to perform the quadruple scaling operation, wherein the first number of input channels and the first number of output channels are at least an even positive integer greater than or equal to 2; and performing the convolution operations by the sharing layer calculator group based on a second number of input channels and a second number of output channels when the scaling signal indicates to perform the double scaling operation, and the first number of input channels is twice as big as the second number of input channels, and the first number of output channels is twice as big as the second number of output channels.

According to the above descriptions, the super resolution technology (at least including the apparatus and the method) provided by the present disclosure by limiting the corresponding relationship between the number of input channels and the number of output channels during different scaling operations (e.g., double scaling operation and quadruple scaling operation), so that the number of multiply-accumulate calculators required for the corresponding double scaling operation and the quadruple scaling operation is the same. Therefore, the super resolution technology provided by the present disclosure can still share the same feature extraction circuit when the scaling operation is performed at different scaling operations. The purpose of saving circuit area is achieved, and the disadvantage of the prior art that requires the additional design of hardware circuits corresponding to different scaling operations is solved.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a super resolution device and method according to the present disclosure will be explained with reference to embodiments thereof. However, these embodiments are not intended to limit the present disclosure to any environment, applications, or implementations described in these embodiments. Therefore, the description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1A:
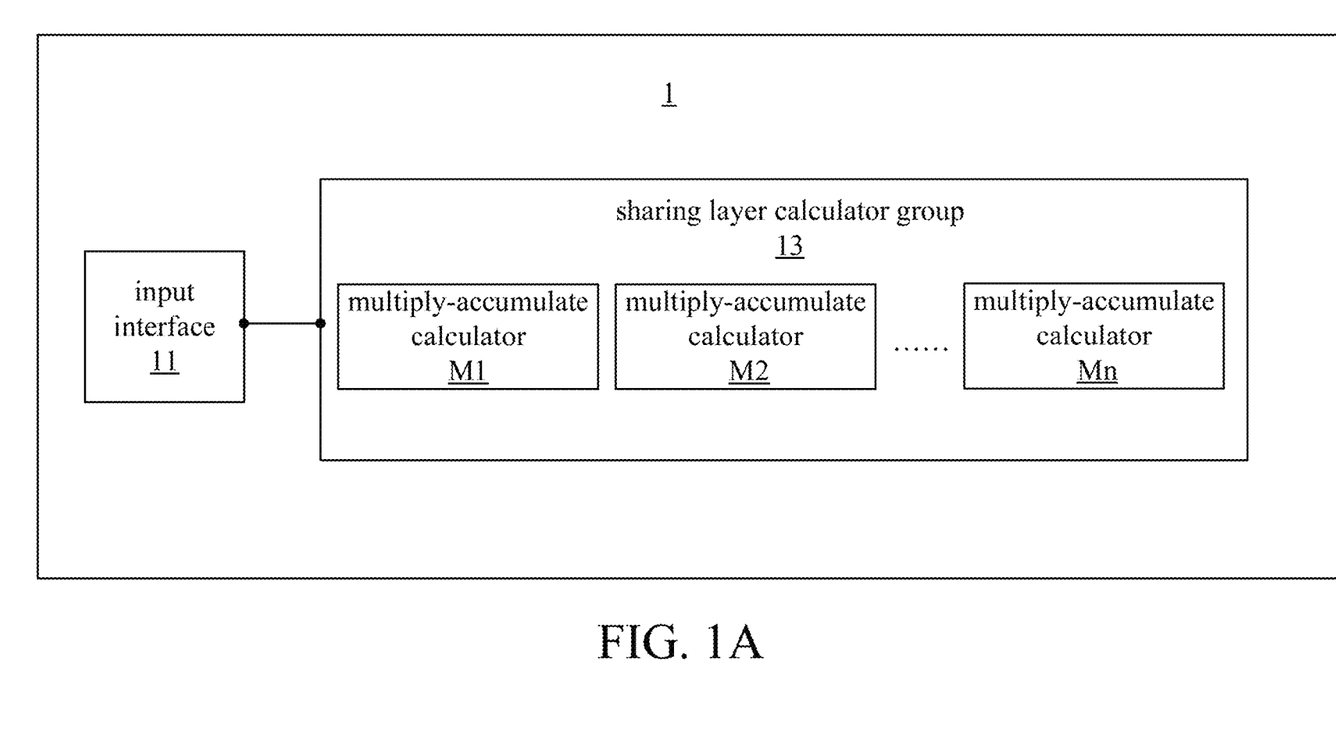
FIG. 1A is a schematic view depicting a super resolution device of the first embodiment.

A first embodiment of the present disclosure is a super resolution device 1 and a schematic view is depicted in FIG. 1A. The super resolution device 1 comprises an input interface 11 and a sharing layer calculator group 13. The input interface 11 is an interface capable of receiving and transmitting data or other interfaces capable of receiving and transmitting data and known to those of ordinary skill in the art. The sharing layer calculator group 13 comprises a plurality of multiply-accumulate calculators M1, M2, ..., Mn (hereinafter referred to as the first number), the multiply-accumulate calculators M1, M2, ..., Mn are configured to perform a plurality of convolution operations corresponding to a feature extraction, the content of performing these convolution operations will be described in detail later.

Figure 1B:
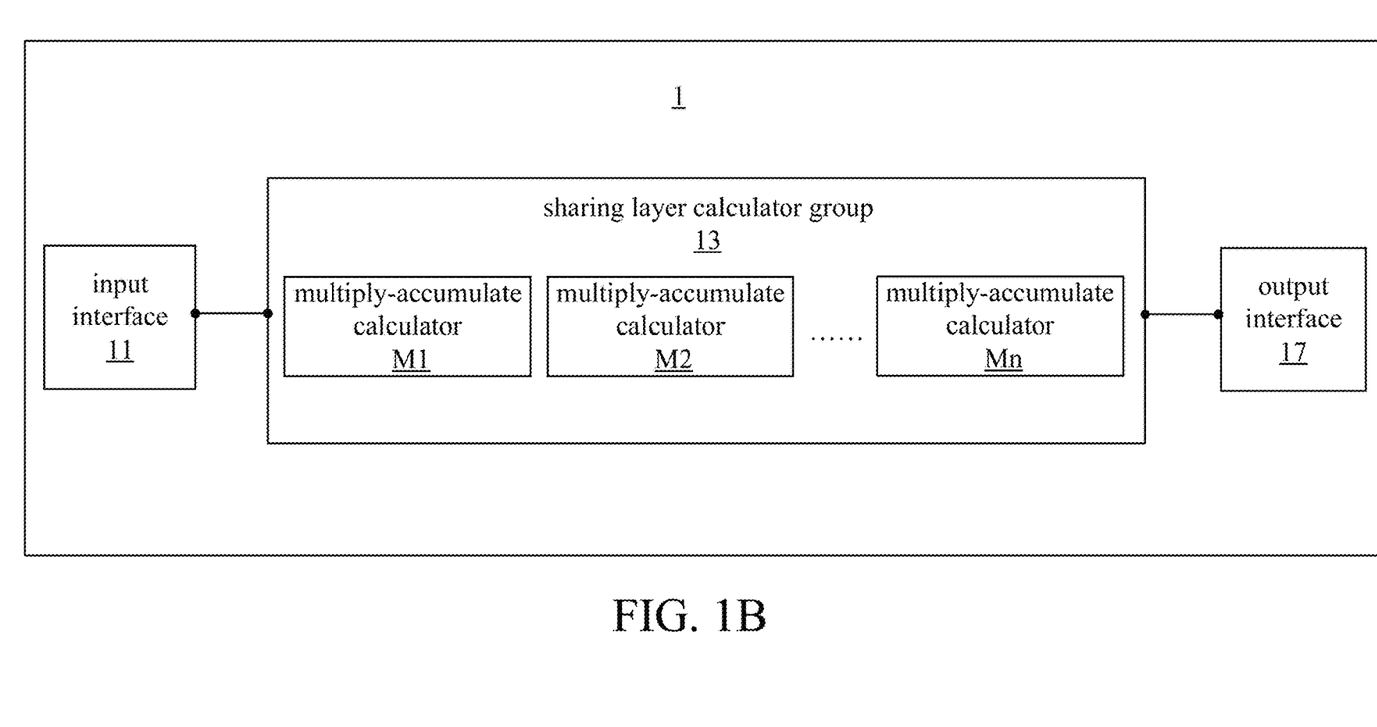
FIG. 1B is a schematic view depicting a super resolution device of some embodiments.

In some embodiments, as shown in FIG. 1B, the super resolution device 1 may further comprise an output interface 17, and the output interface 17 is electrically connected to the sharing layer calculator group 13. The output interface 17 may convert the feature information output by the sharing layer calculator group 13 into corresponding output images according to the selected scaling operation (e.g., the double scaling operation or the quadruple scaling operation).

It shall be appreciated that, in order to share the computing devices used in the double scaling operation and the quadruple scaling operation, it is necessary to limit the number of multiply-accumulate calculators comprised in the shared-layer operator group. In the present embodiment, the first number is twice as big as an initial number of output channels.

For example, when the initial number of output channels of the corresponding image is 2, the sharing layer calculator group 13 comprises four multiply accumulate calculators M1, M2, M3, and M4. The double scaling operation and the quadruple scaling operation may jointly use the multiply accumulate calculators M1, M2, M3, and M4 in the sharing layer calculator group 13 to complete the feature extraction operation.

It shall be appreciated that the super resolution device 1 also comprises other necessary components or operations for performing super resolution operations, such as pixel shuffle operations. Since the present invention focuses on the hardware sharing operation related to the feature extraction, only the implementation details related to the present disclosure will be detailed in the following paragraphs.

In the present embodiment, the input interface 11 is configured to receive an image and a scaling signal, wherein the scaling signal is configured to indicate to perform a double scaling operation or a quadruple scaling operation to the image. In some embodiments, the super resolution device 1 may also comprise a multiplexer (MUX), and the double scaling operation or the quadruple scaling operation can be selected through the multiplexer. In addition, the output interface 17 can convert the feature information output by the sharing layer calculator group 13 into corresponding output images according to the scaling operation (e.g., the double scaling operation or the quadruple scaling operation) performed by the multiplexer.

It shall be appreciated that when designing a hardware product, the super resolution device 1 needs to define a maximum image resolution output size (for example: 3840*2160). Therefore, for different magnifications (i.e., scaling operations), the maximum resolution input size of images acceptable to the super resolution device 1 is different. For example, when the maximum resolution output size of the super resolution device 1 is 3840*2160, the maximum image input resolution acceptable to the super resolution device 1 performing the double scaling operation is 1920*1080 (i.e., the half width and the half length). When performing the quadruple scaling operation, the image input resolution acceptable to the super resolution device 1 is at most 960*540 (i.e., the quarter width and the quarter length).

It shall be appreciated that when the output resolution is 3840*2160, the maximum input corresponding to the quadruple scaling operation is 960*540, and the maximum input corresponding to the double scaling operation is 1920*1080, so the amount of data difference required to be calculated for the two operations is four times (i.e., the length and width are each doubled). Therefore, in order to maintain the same frame rate (for example, a frame rate of 60/s) when the super resolution device 1 performs the double scaling operation and the quadruple scaling operation, the computation amount required for a double scaling operation is 4 times that for a quadruple scaling operation with the same maximum output. The above-mentioned conditions are the key principles when designing the hardware circuit in the present disclosure, so the sharing layer calculator group 13 proposed in the present disclosure will satisfy the above-mentioned conditions.

In the present embodiment, the sharing layer calculator group 13 performs the convolution operations based on different numbers of input channels and output channels corresponding to the double scaling operation or the quadruple scaling operation, respectively. Specifically, when the scaling signal indicates to perform the quadruple scaling operation, the sharing layer calculator group 13 performs the convolution operations based on a first number of input channels and a first number of output channels, and the first number of input channels and the first number of output channels are at least an even positive integer greater than or equal to 2.

Furthermore, when the scaling signal indicates to perform the double scaling operation, the sharing layer calculator group 13 performs the convolution operations based on a second number of input channels and a second number of output channels, and the first number of input channels is twice as big as the second number of input channels, and the first number of output channels is twice as big as the second number of output channels.

In some embodiments, the initial number of output channels corresponding to the sharing layer calculator group 13 needs to be an even number. Therefore, before the sharing layer calculator group 13 performs the convolution operations, the super resolution device 1 further performs a first layer convolution operation on the image to convert the initial number of output channels into a multiple of 2. Specifically, please refer to FIG. 5A, the super resolution device 1 further comprises a first layer calculator 12, and the first layer calculator 12 is electrically connected to the input interface 11 and the sharing layer calculator group 13. The first layer calculator 12 is configured to perform a first layer convolution operation, wherein the first layer convolution operation corresponds to the initial number of output channels (i.e., after the first layer of convolution operation, the number of output channels corresponding to the image is the initial number of output channels), and the initial number of output channels is an even positive integer.

Figure 5A:
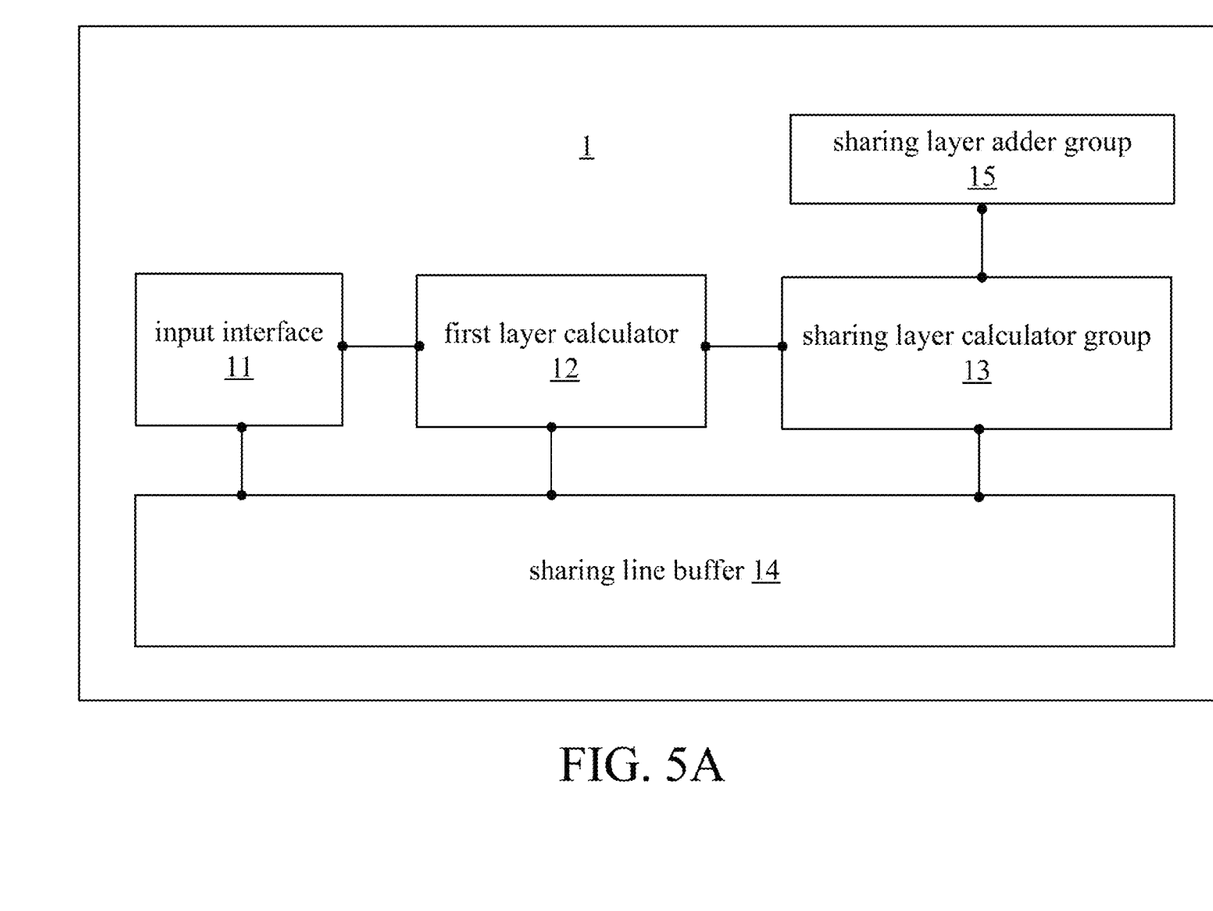
FIG. 5A is a schematic view depicting a super resolution device of some embodiments.
Figure 5B:
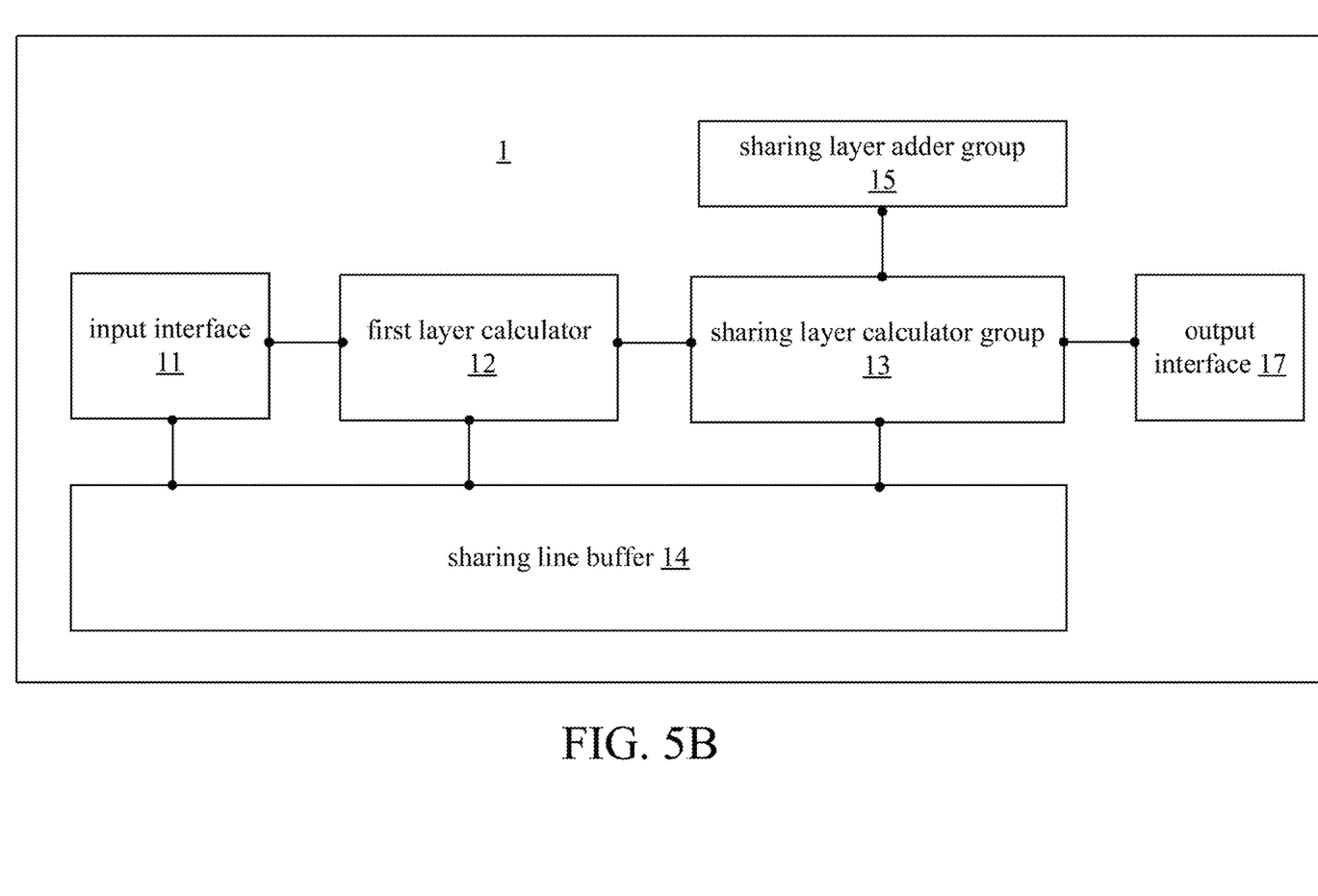
FIG. 5B is a schematic view depicting a super resolution device of some embodiments.

In some embodiments, as shown in FIG. 5B, the super resolution device 1 may further comprise an output interface 17, and the output interface 17 is electrically connected to the sharing layer calculator group 13. The output interface 17 may convert the feature information output by the sharing layer calculator group 13 into corresponding output images according to the selected scaling operation (e.g., the double scaling operation or the quadruple scaling operation).

In some embodiments, the multiply-accumulate calculators M1, M2, . . . , Mn perform the convolution operations based on a convolution kernel (i.e., kernel), the convolution kernel corresponds to a width value and a length value, and each of the convolution operations is performed by one of the multiply-accumulate calculators M1, M2, . . . , Mn.

In some embodiments, each of the convolution operations performed by each of the multiply-accumulate calculators comprises: performing N*M times multiplication operations and (N*M)−1 times addition operations, wherein N is the width value corresponding to the convolution kernel, M is the length value corresponding to the convolution kernel, and N and M is a positive integer.

Figure 2:
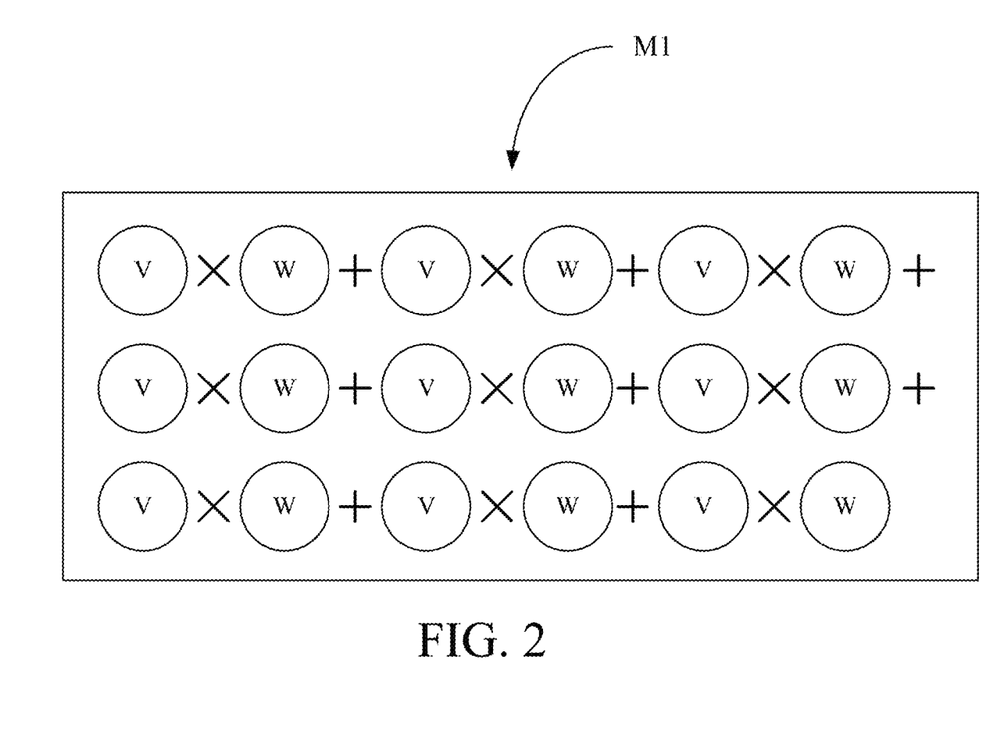
FIG. 2 is a schematic view depicting a multiply-accumulate calculator of the first embodiment.

For ease of understanding, please refer to FIG. 2. FIG. 2 illustrates the multiplication and addition operations performed by the multiply-accumulate calculator M1 when the width and length of the convolution kernel are respectively 3*3, and V and W correspond to the pixel values and the weight corresponding to the convolution kernel, respectively. It can be seen from FIG. 2 that when the convolution kernel is 3*3, the multiply-accumulate calculator M1 needs to perform 9 times multiplication operations and 8 times addition operations.

It shall be appreciated that, in the present embodiment, each of the multiply-accumulate calculators M1, M2, . . . , Mn performs the same number of multiplication operations and addition operations. In addition, since the same convolution kernel corresponds to the same number of multiplication operations and addition operations, each of the multiply-accumulate calculators may perform aforementioned multiplication operations and addition operations through a fixed number of hardware components (e.g., 9 multipliers and 8 adders). Those of ordinary skill in the art shall appreciate the implementation of each of the multiply-accumulate calculators based on the foregoing descriptions. Therefore, the details will not be repeated herein.

For ease of understanding, the following paragraphs will detail specific examples of performing these convolution operations using the sharing layer calculator group 13 in the double scaling operation and the quadruple scaling operation, respectively. It shall be appreciated that, in the following specific example, the sharing layer calculator group 13 may perform the convolution operations corresponding to the double scaling operation and the quadruple scaling operation based on different numbers of input channels and output channels, respectively.

Figure 3A:
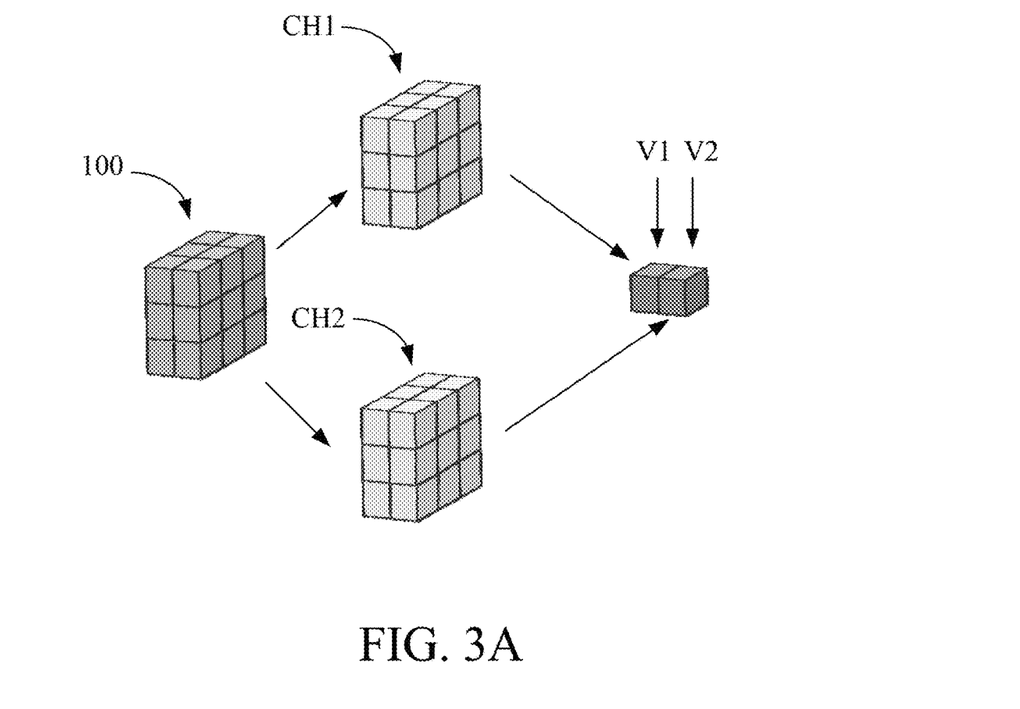
FIG. 3A is a schematic view depicting a quadruple scaling operation of the first embodiment.
Figure 3B:
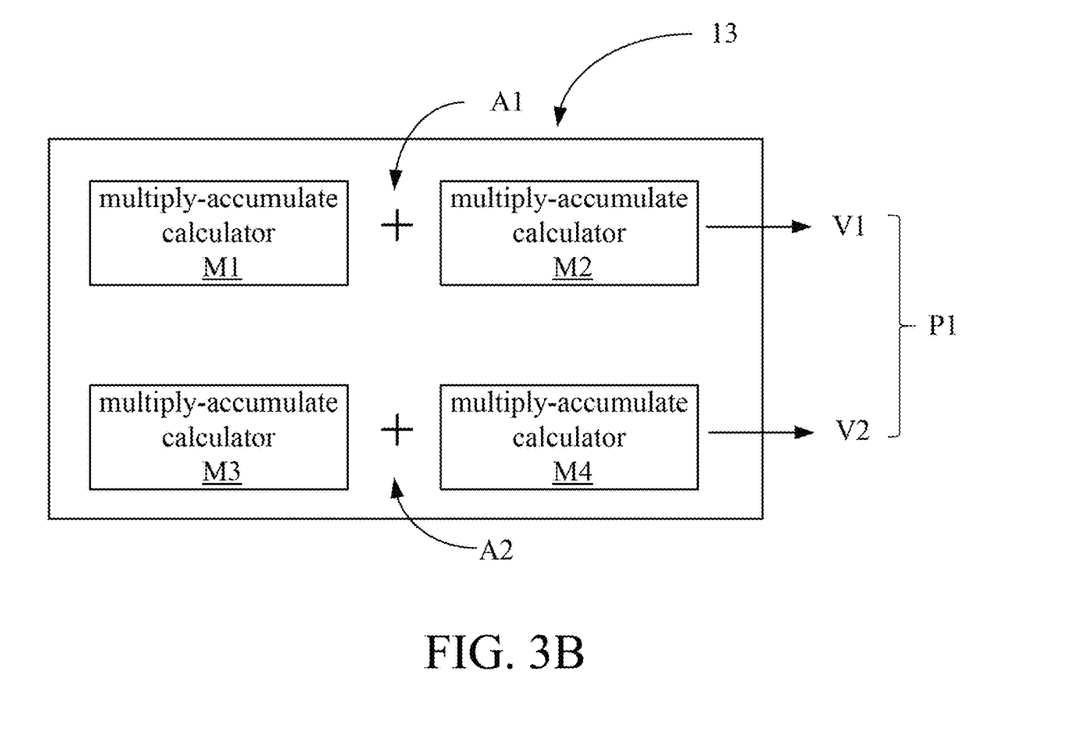
FIG. 3B is a schematic view depicting a quadruple scaling operation of the first embodiment.

First, please refer to FIG. 3A and FIG. 3B for a specific example corresponding to the quadruple scaling operation, but it is not intended to limit the scope of the present disclosure. In the present example, the convolution kernel is set to 3*3, and the number of input channels and output channels are both set to 2. As shown in FIG. 3A, the sharing layer calculator group 13 may perform a convolution operation on the input image 100 through convolution kernels with two input channels (i.e., convolution kernel CH1 and convolution kernel CH2) to generate the value V1 and the value V2 corresponding to the number of two output channels.

As shown in FIG. 3B, the sharing layer calculator group 13 may perform the above-mentioned convolution operation through four multiply-accumulate calculators M1, M2, M3, and M4. Specifically, the value V1 is calculated by the multiply-accumulate calculators M1 and M2, and the value V2 is calculated by the multiply-accumulate calculators M3 and M4. In some embodiments, the value V1 and the value V2 may further generate the pixel P1 through other operations (e.g., bias, activation function, etc.).

Figure 4A:
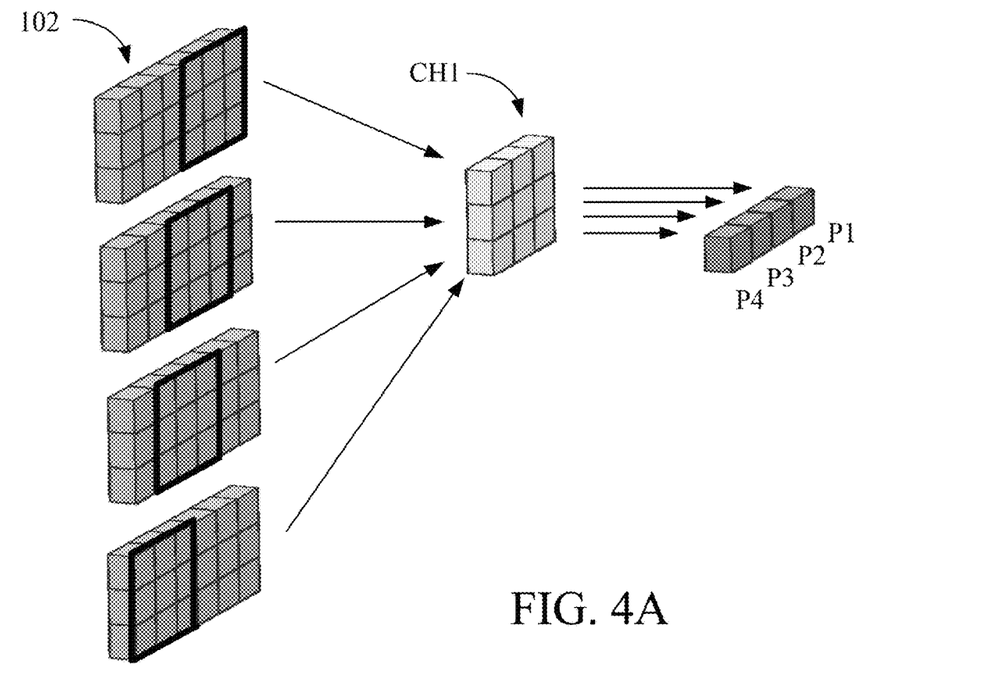
FIG. 4A is a schematic view depicting a double scaling operation of the first embodiment.
Figure 4B:
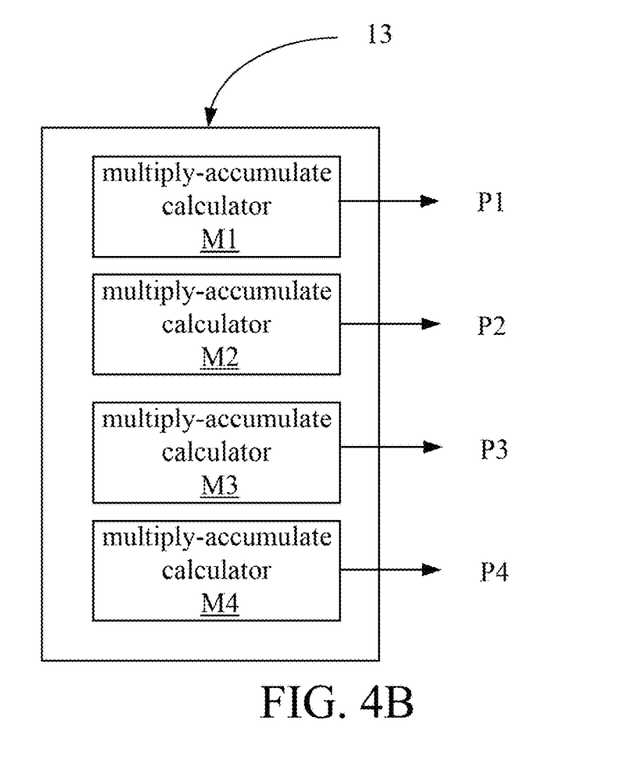
FIG. 4B is a schematic view depicting a double scaling operation of the first embodiment.

Next, please refer to FIG. 4A and FIG. 4B for a specific example corresponding to the double scaling operation, but it is not intended to limit the scope of the present disclosure. In the present example, the convolution kernel is also set to 3*3, but the number of input channels and the number of output channels are both set to 1 (i.e., the number of input channels and the number of output channels are half of the corresponding quadruple scaling operation). As shown in FIG. 4A, the sharing layer calculator group 13 may perform a convolution operation on the input image 102 through a convolution kernel with one input channel (i.e., the convolution kernel CH1) to generate four pixels P1, P2, P3, and P4.

As shown in FIG. 4B, the sharing layer calculator group 13 may perform the above-mentioned convolution operation through the same four multiply-accumulate calculators M1, M2, M3, and M4. Specifically, the pixels P1, P2, P3, and P4 are calculated by the multiply-accumulate calculators M1, M2, M3, and M4, respectively. In some embodiments, the pixels P1, P2, P3, and P4 are further generated through other operations (e.g., bias, activation function, etc.).

As can be seen from the foregoing specific examples, in the present disclosure, the number of input channels and the number of output channels corresponding to the double scaling operation and the quadruple scaling operation are limited (i.e., the number of input channels corresponding to the quadruple scaling operation is twice as big as the number of input channels corresponding to the double scaling operation, and the number of output channels corresponding to the quadruple scaling operation is twice as big as the number of output channels corresponding to the double scaling operation). Since the number of multiply-accumulate calculators required for the double scaling operation and the quadruple scaling operation is the same, the same hardware circuit can be shared, and the same frame rate can be satisfied (i.e., the amount of computation required for the double scaling operation is 4 times that for the quadruple scaling operation).

It shall be appreciated that the foregoing examples are only examples, but are not intended to limit the scope of the present disclosure. It should be understood that, in other embodiments, when the number of input channels or the number of output channels increases, because the sharing layer calculator group 13 has the aforementioned limitation (i.e., the number of input channels corresponding to the quadruple scaling operation is twice as big as the number of input channels corresponding to the double scaling operation, and the number of output channels corresponding to the quadruple scaling operation is twice as big as the number of output channels corresponding to the double scaling operation), the number of multiply-accumulate calculators required for the double scaling operation and the quadruple scaling operation will remain the same. Therefore, the same hardware circuits can be shared. Those with ordinary knowledge in the art should be able to understand the implementation of different numbers of input channels and output channels based on the foregoing content, so no further description is needed.

In some embodiments, please refer to FIG. 5A, the super resolution device 1 further comprises a sharing layer adder group 15, the sharing layer adder group 15 is electrically connected to the sharing layer calculator group 13, and the sharing layer adder group 15 is configured to perform a plurality of addition operations. Among them, the super resolution device 1 generates a plurality of pixels corresponding to the image through the sharing layer calculator group 13 and the sharing layer adder group 15. For example, the sharing layer adder group 15 is configured to perform the addition operations A1 and A2 in FIG. 3B, or the additional operations for calculating P3 and P4 in FIG. 4B (i.e., two additional sets of the addition operations of the bias and the activation function).

It shall be appreciated that the number of addition operations performed by the sharing layer adder group 15 is related to the number of input channels and the number of output channels. Specifically, when the scaling signal indicates to perform the quadruple scaling operation, the sharing layer adder group 15 performs the addition operations corresponding to a second number to generate the pixels corresponding to the image. When the scaling signal indicates to perform the double scaling operation, the sharing layer adder group 15 performs the addition operations corresponding to a third number to generate the pixels corresponding to the image. The second number is generated based on the first number of input channels and the first number of output channels, and the second number is the same as the third number (i.e., due to the same number of additional addition operations, the double scaling operation and the quadruple scaling operation can use the sharing layer adder group 15 together).

In some embodiments, please refer to FIG. 5A. The super resolution device 1 further comprises a sharing line buffer 14. The sharing line buffer 14 comprises a plurality of temporary storage blocks corresponding to a fourth number, wherein the sharing layer calculator group performs the convolution operations corresponding to the quadruple scaling operation and the double scaling operation based on the temporary storage blocks, and the fourth number is generated based on the first number of input channels and the first number of output channels.

It shall be appreciated that since the number of multiply-accumulate calculators required for the double scaling operation and the quadruple scaling operation are the same, the required temporary storage blocks are also the same. Accordingly, the super resolution device 1 may jointly use the sharing line buffer 14 to perform these convolution operations through the operation of address allocation (e.g., by pointing to the location of the temporary storage block).

According to the above descriptions, the super resolution device 1 provided by the present disclosure by limiting the corresponding relationship between the number of input channels and the number of output channels during different scaling operations (e.g., double scaling operation and quadruple scaling operation), so that the number of multiply-accumulate calculators required for the corresponding double scaling operation and the quadruple scaling operation is the same. Therefore, the super resolution device 1 provided by the present disclosure can still share the same feature extraction circuit when the scaling operation is performed at different scaling operations. The purpose of saving circuit area is achieved, and the disadvantage of the prior art that requires the additional design of hardware circuits corresponding to different scaling operations is solved.

Figure 6:
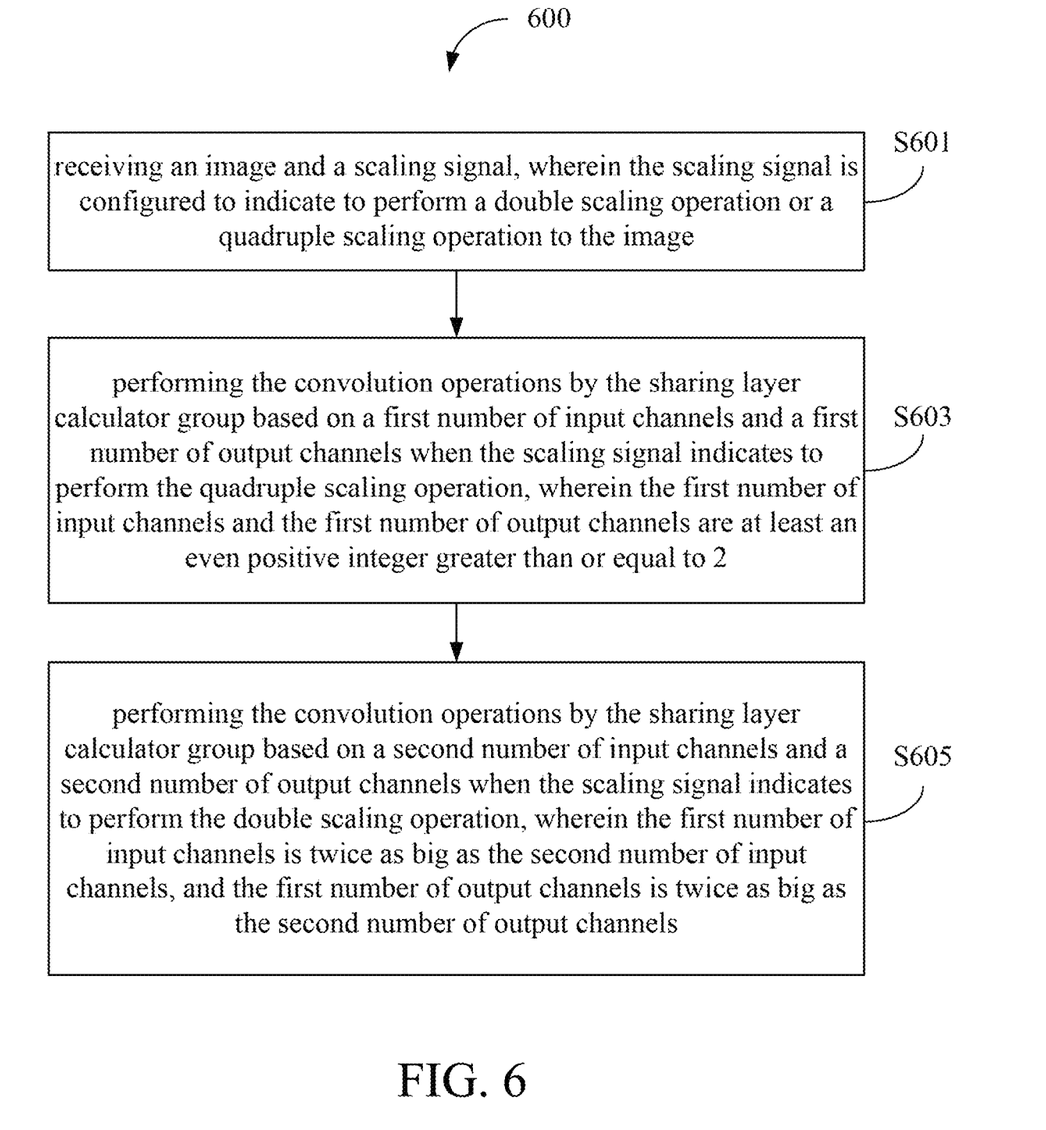
FIG. 6 is a partial flowchart depicting a super resolution method of the second embodiment.

A second embodiment of the present disclosure is a super resolution method and a flowchart thereof is depicted in FIG. 6. The super resolution method 600 is adapted for a super resolution device (e.g., the super resolution device 1 of the first embodiment). The super resolution device comprises an input interface and a sharing layer calculator group (e.g., the input interface 11 and the sharing layer calculator group 13 of the first embodiment), the sharing layer calculator group comprises a plurality of multiply-accumulate calculators corresponding to a first number, the multiply-accumulate calculators are configured to perform a plurality of convolution operations, and the first number is twice as big as an initial number of output channels. The super resolution method 600 performs the convolution operations by using the sharing layer calculator group through steps S601 to S605.

In some embodiments, the super resolution device may further comprise an output interface (e.g., the output interface 17 of the first embodiment). The output interface is electrically connected to the sharing layer calculator group. The output interface may convert the feature information output by the sharing layer calculator group into corresponding output images according to the selected scaling operation (e.g., the double scaling operation or the quadruple scaling operation).

In the step S601, the super resolution device receives an image and a scaling signal, wherein the scaling signal is configured to indicate to perform a double scaling operation or a quadruple scaling operation to the image. Next, in the step S603, the super resolution device performs the convolution operations by the sharing layer calculator group based on a first number of input channels and a first number of output channels when the scaling signal indicates to perform the quadruple scaling operation, wherein the first number of input channels and the first number of output channels are at least an even positive integer greater than or equal to 2.

In the step S605, the super resolution device performs the convolution operations by the sharing layer calculator group based on a second number of input channels and a second number of output channels when the scaling signal indicates to perform the double scaling operation, wherein the first number of input channels is twice as big as the second number of input channels, and the first number of output channels is twice as big as the second number of output channels.

In some embodiments, wherein the super resolution device further comprises a first layer calculator, the first layer calculator is electrically connected to the input interface and the sharing layer calculator group, and the super resolution method 600 further comprises following steps: performing a first layer convolution operation by the first layer calculator, wherein the first layer convolution operation corresponds to the initial number of output channels, and the initial number of output channels is an even positive integer.

In some embodiments, the image corresponds to an input resolution, the super resolution device corresponds to a maximum output resolution, and the super resolution method 600 further comprises following steps: wherein when the scaling signal indicates to perform the quadruple scaling operation, the input resolution corresponding to the image is at most a quarter width and a quarter length of the maximum output resolution; wherein when the scaling signal indicates to perform the double scaling operation, the input resolution corresponding to the image is at most a half width and a half length of the maximum output resolution.

In some embodiments, the super resolution device further comprises a sharing layer adder group, the sharing layer adder group is electrically connected to the sharing layer calculator group, and the super resolution method 600 further comprises following steps: performing a plurality of addition operations by the sharing layer adder group; wherein the sharing layer calculator group and the sharing layer adder group are configured to generate a plurality of pixels corresponding to the image.

In some embodiments, the super resolution method 600 further comprises following steps: wherein when the scaling signal indicates to perform the quadruple scaling operation, the sharing layer adder group performs the addition operations corresponding to a second number to generate the pixels corresponding to the image.

In some embodiments, the super resolution method 600 further comprises following steps: wherein when the scaling signal indicates to perform the double scaling operation, the sharing layer adder group performs the addition operations corresponding to a third number to generate the pixels corresponding to the image.

In some embodiments, the second number is generated based on the first number of input channels and the first number of output channels, and the second number is the same as the third number.

In some embodiments, the multiply-accumulate calculators perform the convolution operations based on a convolution kernel, the convolution kernel corresponds to a width value and a length value, and each of the convolution operations is performed by one of the multiply-accumulate calculators.

In some embodiments, each of the convolution operations performed by each of the multiply-accumulate calculators comprises following steps: performing N*M times multiplication operations and (N*M)−1 times addition operations, wherein N is the width value corresponding to the convolution kernel, M is the length value corresponding to the convolution kernel, and N and M is a positive integer.

In some embodiments, the super resolution device further comprises a sharing line buffer, the sharing line buffer comprises a plurality of temporary storage blocks corresponding to a fourth number, and the super resolution method 600 further comprises following steps: performing the convolution operations corresponding to the quadruple scaling operation and the double scaling operation based on the temporary storage blocks by the sharing layer calculator group, wherein the fourth number is generated based on the first number of input channels and the first number of output channels.

In addition to the aforesaid steps, the second embodiment can also execute all the operations and steps of the super resolution device 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present disclosure, some words (e.g., the number of input channels, the number of output channels, and the number, etc.) are preceded by terms such as "first", "second", "third", and "fourth", and these terms of "first", "second", "third", and "fourth" are only used to distinguish these different words. For example, the "first" and "second" number of input channels are only used to indicate the number of input channels used in different phases.

According to the above descriptions, the super resolution technology (at least including the apparatus and the method) provided by the present disclosure by limiting the corresponding relationship between the number of input channels and the number of output channels during different scaling operations (e.g., double scaling operation and quadruple scaling operation), so that the number of multiply-accumulate calculators required for the corresponding double scaling operation and the quadruple scaling operation is the same. Therefore, the super resolution technology provided by the present disclosure can still share the same feature extraction circuit when the scaling operation is performed at different scaling operations. The purpose of saving circuit area is achieved, and the disadvantage of the prior art that requires the additional design of hardware circuits corresponding to different scaling operations is solved.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A super resolution device, comprising:
   an input interface, being configured to receive an image and a scaling signal, wherein the scaling signal is configured to indicate to perform a double scaling operation or a quadruple scaling operation to the image; and
   a sharing layer calculator group, comprising a plurality of multiply-accumulate calculators corresponding to a first number, wherein the multiply-accumulate calculators are configured to perform a plurality of convolution operations, and the first number is twice as big as an initial number of output channels, and each of the multiply-accumulate calculators performs a plurality of corresponding multiplication operations and addition operations through a fixed number of hardware components;

wherein the sharing layer calculator group performs the double scaling operation or the quadruple scaling operation based on the scaling signal, and the sharing layer calculator group jointly uses the same number of the multiply-accumulate calculators to perform the double scaling operation and the quadruple scaling operation to the image;

wherein the sharing layer calculator group performs the convolution operations based on a first number of input channels and a first number of output channels when the scaling signal indicates to perform the quadruple scaling operation, the first number of input channels and the first number of output channels are at least an even positive integer greater than or equal to 2;

wherein the sharing layer calculator group performs the convolution operations based on a second number of input channels and a second number of output channels when the scaling signal indicates to perform the double scaling operation;

wherein the first number of input channels is twice as big as the second number of input channels, and the first number of output channels is twice as big as the second number of output channels.

2. The super resolution device of claim 1, further comprising:
a first layer calculator, being electrically connected to the input interface and the sharing layer calculator group, and being configured to perform a first layer convolution operation, wherein the first layer convolution operation corresponds to the initial number of output channels, and the initial number of output channels is an even positive integer.

3. The super resolution device of claim 1, wherein the image corresponds to an input resolution, the super resolution device corresponds to a maximum output resolution, and the super resolution device further comprises following operations:
wherein when the scaling signal indicates to perform the quadruple scaling operation, the input resolution corresponding to the image is at most a quarter width and a quarter length of the maximum output resolution;
wherein when the scaling signal indicates to perform the double scaling operation, the input resolution corresponding to the image is at most a half width and a half length of the maximum output resolution.

4. The super resolution device of claim 1, further comprising:
a sharing layer adder group, being electrically connected to the sharing layer calculator group, and being configured to perform a plurality of addition operations;
wherein the sharing layer calculator group and the sharing layer adder group are configured to generate a plurality of pixels corresponding to the image.

5. The super resolution device of claim 4, wherein the super resolution device further comprises following operations:
wherein when the scaling signal indicates to perform the quadruple scaling operation, the sharing layer adder group performs the addition operations corresponding to a second number to generate the pixels corresponding to the image.

6. The super resolution device of claim 5, wherein the super resolution device further comprises following operations:

wherein when the scaling signal indicates to perform the double scaling operation, the sharing layer adder group performs the addition operations corresponding to a third number to generate the pixels corresponding to the image.

7. The super resolution device of claim 6, wherein the second number is generated based on the first number of input channels and the first number of output channels, and the second number is the same as the third number.

8. The super resolution device of claim 1, wherein the multiply-accumulate calculators perform the convolution operations based on a convolution kernel, the convolution kernel corresponds to a width value and a length value, and each of the convolution operations is performed by one of the multiply-accumulate calculators.

9. The super resolution device of claim 8, wherein each of the convolution operations performed by each of the multiply-accumulate calculators comprises following operations:
performing N*M times multiplication operations and (N*M)−1 times addition operations, wherein N is the width value corresponding to the convolution kernel, M is the length value corresponding to the convolution kernel, and N and M is a positive integer.

10. The super resolution device of claim 1, further comprising:
a sharing line buffer, comprising a plurality of temporary storage blocks corresponding to a fourth number, wherein the sharing layer calculator group performs the convolution operations corresponding to the quadruple scaling operation and the double scaling operation based on the temporary storage blocks, and the fourth number is generated based on the first number of input channels and the first number of output channels.

11. A super resolution method, being adapted for use in a super resolution device, wherein the super resolution device comprises an input interface and a sharing layer calculator group, the sharing layer calculator group comprises a plurality of multiply-accumulate calculators corresponding to a first number, the multiply-accumulate calculators are configured to perform a plurality of convolution operations, the first number is twice as big as an initial number of output channels, each of the multiply-accumulate calculators performs a plurality of corresponding multiplication operations and addition operations through a fixed number of hardware components, and the super resolution method comprises following steps:
receiving an image and a scaling signal, wherein the scaling signal is configured to indicate to perform a double scaling operation or a quadruple scaling operation to the image;
performing the convolution operations by the sharing layer calculator group based on a first number of input channels and a first number of output channels when the scaling signal indicates to perform the quadruple scaling operation, wherein the first number of input channels and the first number of output channels are at least an even positive integer greater than or equal to 2; and
performing the convolution operations by the sharing layer calculator group based on a second number of input channels and a second number of output channels when the scaling signal indicates to perform the double scaling operation;
wherein the sharing layer calculator group performs the double scaling operation or the quadruple scaling operation based on the scaling signal, and the sharing layer calculator group jointly uses the same number of the multiply-accumulate calculators to perform the double scaling operation and the quadruple scaling operation to the image;

wherein the first number of input channels is twice as big as the second number of input channels, and the first number of output channels is twice as big as the second number of output channels.

12. The super resolution method of claim 11, wherein the super resolution device further comprises a first layer calculator, the first layer calculator is electrically connected to the input interface and the sharing layer calculator group, and the super resolution method further comprises following steps:

performing a first layer convolution operation by the first layer calculator, wherein the first layer convolution operation corresponds to the initial number of output channels, and the initial number of output channels is an even positive integer.

13. The super resolution method of claim 11, wherein the image corresponds to an input resolution, the super resolution device corresponds to a maximum output resolution, and the super resolution method further comprises following steps:

wherein when the scaling signal indicates to perform the quadruple scaling operation, the input resolution corresponding to the image is at most a quarter width and a quarter length of the maximum output resolution;

wherein when the scaling signal indicates to perform the double scaling operation, the input resolution corresponding to the image is at most a half width and a half length of the maximum output resolution.

14. The super resolution method of claim 11, wherein the super resolution device further comprises a sharing layer adder group, the sharing layer adder group is electrically connected to the sharing layer calculator group, and the super resolution method further comprises following steps:

performing a plurality of addition operations by the sharing layer adder group;

wherein the sharing layer calculator group and the sharing layer adder group are configured to generate a plurality of pixels corresponding to the image.

15. The super resolution method of claim 14, wherein the super resolution method further comprises following steps:

wherein when the scaling signal indicates to perform the quadruple scaling operation, the sharing layer adder group performs the addition operations corresponding to a second number to generate the pixels corresponding to the image.

16. The super resolution method of claim 15, wherein the super resolution method further comprises following steps:

wherein when the scaling signal indicates to perform the double scaling operation, the sharing layer adder group performs the addition operations corresponding to a third number to generate the pixels corresponding to the image.

17. The super resolution method of claim 16, wherein the second number is generated based on the first number of input channels and the first number of output channels, and the second number is the same as the third number.

18. The super resolution method of claim 11, wherein the multiply-accumulate calculators perform the convolution operations based on a convolution kernel, the convolution kernel corresponds to a width value and a length value, and each of the convolution operations is performed by one of the multiply-accumulate calculators.

19. The super resolution method of claim 18, wherein each of the convolution operations performed by each of the multiply-accumulate calculators comprises following steps:

performing N*M times multiplication operations and (N*M)−1 times addition operations, wherein N is the width value corresponding to the convolution kernel, M is the length value corresponding to the convolution kernel, and N and M is a positive integer.

20. The super resolution method of claim 11, wherein the super resolution device further comprises a sharing line buffer, the sharing line buffer comprises a plurality of temporary storage blocks corresponding to a fourth number, and the super resolution method further comprises following steps:

performing the convolution operations corresponding to the quadruple scaling operation and the double scaling operation based on the temporary storage blocks by the sharing layer calculator group, wherein the fourth number is generated based on the first number of input channels and the first number of output channels.

* * * * *